United States Patent
Nishizawa et al.

(10) Patent No.: US 6,519,598 B1
(45) Date of Patent: Feb. 11, 2003

(54) ACTIVE MEMORY AND MEMORY CONTROL METHOD, AND HETEROGENEOUS DATA INTEGRATION USE SYSTEM USING THE MEMORY AND METHOD

(75) Inventors: Itaru Nishizawa, Kodaira (JP); Mamoru Sugie, Tokorozawa (JP); Nobutoshi Sagawa, Koganei (JP); Hiroaki Odawara, Kodaira (JP); Shigekazu Inohara, Kokubunji (JP); Frederico Maciel, Kokubunji (JP); Naoki Watanabe, Kokubunji (JP); Aki Tomita, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/382,695

(22) Filed: Aug. 25, 1999

(30) Foreign Application Priority Data

Mar. 18, 1999 (JP) ........................................... 11-073107

(51) Int. Cl.[7] .............................................. G06F 17/30
(52) U.S. Cl. ......................... 707/10; 707/513; 709/201
(58) Field of Search ............................. 707/1–10, 513; 711/100, 112, 152, 163; 704/275; 705/53; 360/98.04; 709/200, 206, 246, 228, 224, 223, 231, 226, 217, 201

(56) References Cited

U.S. PATENT DOCUMENTS

| | | | | |
|---|---|---|---|---|
| 5,513,156 A | * | 4/1996 | Hanaoka et al. | 360/98.04 |
| 5,611,066 A | * | 3/1997 | Keele et al. | 711/100 |
| 5,761,696 A | * | 6/1998 | Gioradano et al. | 707/1 |
| 6,006,308 A | * | 12/1999 | Matsunami et al. | 711/112 |
| 6,044,445 A | * | 3/2000 | Tsuda et al. | 711/152 |
| 6,334,126 B1 | * | 12/2001 | Nagatomo et al. | 707/4 |

OTHER PUBLICATIONS

Technical Report CMU–CS–97–118, Carnegie–Mellon University, "File Systems for Network–attached Secure Disks", Gibson et al., Jul. 1997.
Proceedings of the 24th VLDB Conference, New York, 1998, "Active Storage For Large–Scale Data Mining and Multimedia", E. Riedel et al.
"The Java Tutorial", Campione et al., ISBN 0–201–63454–6, Mar. 12, 1999.

* cited by examiner

Primary Examiner—John Breene
Assistant Examiner—Mohammad Ali
(74) Attorney, Agent, or Firm—Mattingly, Stanger & Malur, P.C.

(57) ABSTRACT

A data request analysis unit for accepting and analyzing a request from a client computer, a data conversion program generation unit, and a data conversion unit are provided in a magnetic disk apparatus, the data conversion program generation unit downloads a program module by way of a network as required based on the analysis result obtained by use of the data request analysis unit to generate a data conversion program, and the data conversion unit downloads the conversion program, and converts the type of the data read out from the magnetic memory medium by use of the program, and directly transfers the converted data to the client computer by way of a network interface, thereby, the present invention provides a general purpose magnetic disk apparatus which is capable of flexibly accommodating the request from the client computer, the scalability of the whole system is improved because the data is converted in the magnetic disk apparatus, and the process efficiency of the client computer is improved.

9 Claims, 13 Drawing Sheets

| DATA PROPERTY MANAGEMENT TABLE | | | | | |
|---|---|---|---|---|---|
| TABLE NAME | COLUMN ID | COLUMN NAME | TYPE | SEMANTIC INFORMATION | |
| Employee | 1 | ID | Integer | H Inc. EMPLOYEE ID | |
| Employee | 2 | Fir_Name | VARChar | H Inc. EMPLOYEE NAME (FIRST NAME) | |
| Employee | 3 | Fam_Name | VARChar | H Inc. EMPLOYEE NAME (FAMILY NAME) | |
| Employee | 4 | Birthday | Char(10) | H Inc. EMPLOYEE BIRTHDAY (B.C.) | |
| Manager | 1 | Emp_Num | Integer | EMPLOYEE NUMBER | |
| ... | ... | ... | ... | ... | |

FIG. 9

PHYSICAL MAPPING MANAGEMENT TABLE

| TABLE NAME | RECORD ID | BLOCK | OFFSET |
|---|---|---|---|
| ... | ... | ... | ... |
| Employee | 100 | 537 | 12800 |
| Manager | 5 | 893 | 5120 |
| ... | ... | ... | ... |

902 — 903 — 904 — 905

901

906 — SELECT ID FROM Employee WHERE Fir_Name="Itaru"

FIG. 10

| DATA OUTPUT FORMAT | DATA ACQUISION CONDITION | DATA FORMAT CONVERSION |
|---|---|---|
| RECORD | SELECT * FROM Employee WHERE Birthday≧1960/01/01 | null |
| COLUMN VALUE | SELECT ID FROM Employee WHERE Fir_Name="Itaru" | Char(15) |
| XML DOCUMENT THE IS NO DESIGNATION OF DOCUMENT DEFINITION | SELECT * FROM Employee WHERE Birthday≧1960/01/01 | null |
| XML DOCUMENT THERE IS A DOCUMENT DEFINITION DTD=http://www.hitachi.co.jp/emp.dtd | SELECT ID,Name FROM Employee WHERE Birthday≧1960/01/01 | Name=Fam_Name+" "+Fir_Name |
| ... | | |

1001 — 1002 — 1003

1004 — 1005 — 1006 — 1007

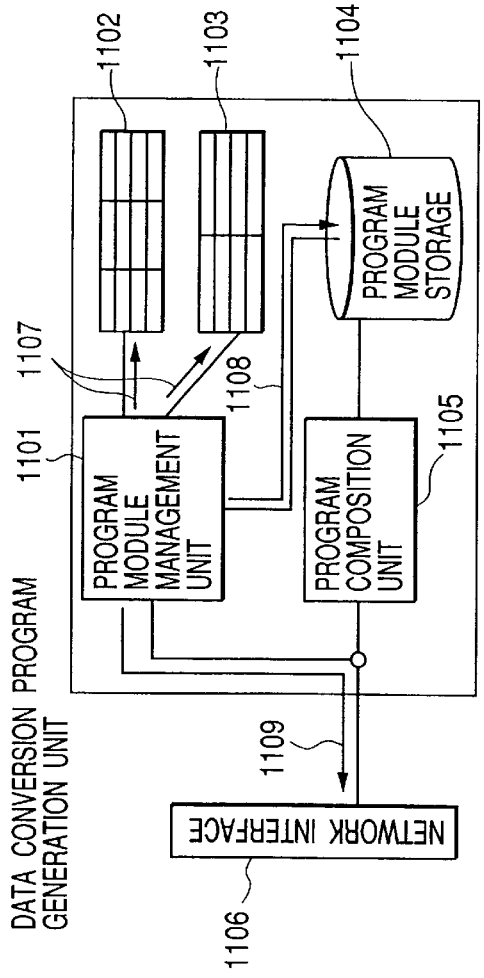
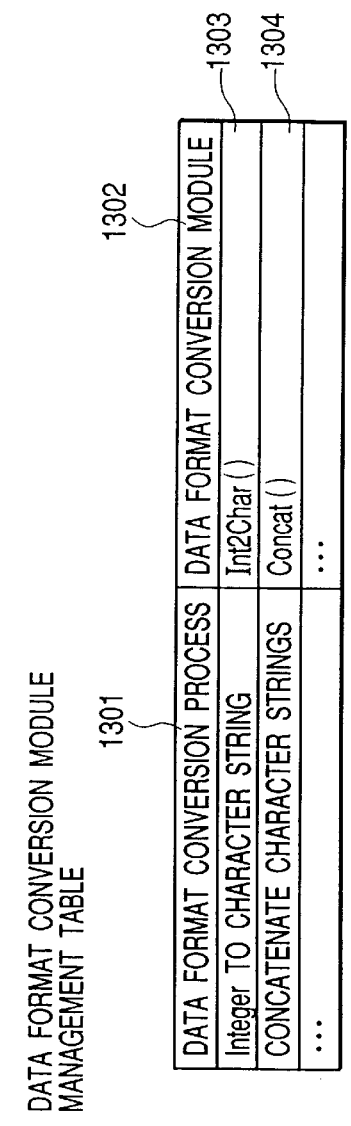

FIG. 12

OUTPUT FORMAT CONVERSION MANAGEMENT TABLE — 1201

| OUTPUT FORMAT | FORMAT CONVERSION PROCESS | FORMAT CONVERSION MODULE |
|---|---|---|
| RECORD | RECORD SELECTION PROCESS | Sel_Record () |
| COLUMN VALUE (VARChar NOT INCLUDED) | RECORD SELECTION PROCESS<br>COLUMN PROJECTION PROCESS | Sel_Record ()<br>Proj_Column_NoVar () |
| COLUMN VALUE (VARChar INCLUDED) | RECORD SELECTION PROCESS<br>COLUMN PROJECTION PROCESS | Sel_Record ()<br>Proj_Column () |
| XML DOCUMENT (THE IS NO DESIGNATION OF DOCUMENT DEFINITION) | RECORD SELECTION PROCESS<br>COLUMN PROJECTION PROCESS<br>XML TAG ADDITION PROCESS | Sel_Record ()<br>Proj_Column ()<br>Add_XML_Tag () |
| XML DOCUMENT (THERE IS A DESIGNATION OF DOCUMENT DEFINITION) | RECORD SELECTION PROCESS<br>COLUMN PROJECTION PROCESS<br>DOCUMENT DEFINITION FILE ANALYZING PROCESS<br>XML TAG ADDITION PROCESS<br>XML TAG MAPPING PROCESS | Sel_Record ()<br>Proj_Column ()<br>Analyze_Def_File ()<br>Add_XML_Tag ()<br>Map_XML_Tag () |
| ... | ... | ... |

1202 — FORMAT CONVERSION PROCESS
1203 — FORMAT CONVERSION MODULE
1204, 1205, 1206, 1207, 1208

ACTIVE MEMORY AND MEMORY CONTROL METHOD, AND HETEROGENEOUS DATA INTEGRATION USE SYSTEM USING THE MEMORY AND METHOD

BACKGROUND OF THE INVENTION

1. Field of the Invention

This invention relates to an active memory control method having built-in data processing function and more particularly relates to a memory control method which is capable of implementing data format conversion internally and an active memory which uses this memory control method.

2. Description the Prior Art

As computer systems have been spread, various data are digitized and stored in a computer system. Various media such as magnetic disks, magnetic tapes, MO, and CD-ROM are used, however, the magnetic disk is mainly used because of capability of high rate random access and readable/writable performance, and low cost per capacity. Magnetic disk apparatus for storing data given from the outside in a magnetic disk and reading and sending out data from a magnetic disk in response to a request from the outside has been widely used.

Because in the conventional magnetic disk apparatus the data input/output unit is a physical unit called as block, it is necessary that a magnetic disk apparatus is connected to a server side computer system (referred to as sever computer hereinafter) and the server computer manages the data input/output to the magnetic disk apparatus to use the data stored in the magnetic disk apparatus by use of a client side computer system (referred to as client computer hereinafter). Then, the server computer manages the magnetic disk apparatus and processes a request from the client computer, such system is called as SAD (Sever-Attached Disks).

Assume that many client computers in which various data are used by way of a network is addressed. The environment is used as a premise for the client server system which is typical of various systems widely used as the network technology has been progressed, and now the environment becomes the most popular. It has been revealed as a problem that the server computer is a bottleneck in SAD in the environment to restrict the scalability of the whole system. For example, in "File systems for Network-attached Secure Disks" by Gibson, D. F. Nagle, K. Amiri, F. W. Chang, H. Gobioff, E. Riedel, D. Rochberg, J. Zelenka, Technical Report CMU-CS-97-118, Carnegie-Mellon University (referred to as literature-1 hereinafter), it is described as an experimental result that, when files on a server computer is accessed by clients by means of NFS (Network File System) service, SAD performance cannot accommodate four or more pairs of client and magnetic disk apparatus. In this case, the majority of the process performed in the server includes I/O process to the magnetic disk apparatus, data conversion process in the server computer, and communication process between the server computer and client computers.

In view of such situation, a method in which a client computer takes access to the magnetic disk apparatus not by way of the server computer to use data is proposed in order to improve the scalability of the whole system. For example, in NASD (Network-Attached Secure disks) system described in the literature-1, data is transferred directly from a magnetic disk apparatus to a client computer system which received an access right from the server computer in the unit of logical object to improve the scalability of the whole system.

Furthermore, in Active Disk described in "Active Storage For Large-Scale Data Mining and Multimedia Applications" by E. Riedel, G. Gibson, C. Faloutsons, Technical Report CMU-CS-98-111, Carnegie Mellon University (referred to as literature-2 hereinafter), a part of process performed in the server heretofore such as edge cutting of a image is performed in the magnetic disk apparatus side to thereby improve the scalability of the whole system.

In the case that a system is structured so that a part of process is performed in a magnetic disk apparatus, if a unit for performing this process is incorporated statically in the magnetic disk apparatus, then switching processing unit and method, depending on current system load, computer resource to be used, and application, becomes difficult. If a module for performing process as a hardware is incorporated for realizing these process, it is necessary to design and fabricate different units for each processing, and these units cannot be general purpose units, and the development cost will be high.

The magnetic disk apparatus in which the data is transferred directly between a client computer and the magnetic disk apparatus not by way of the server computer will improve the system scalability, however, when the data is used actually by a client computer, an extra process is required to convert the data format to a data format desired by the client.

SUMMARY OF THE INVENTION

Accordingly, it is the first object of the present invention to provide a mechanism for converting the data efficiently to a data format required by a client computer, and to provide an active memory unit (for example, magnetic disk apparatus) which is capable of reducing the load on the client computer and a network.

Furthermore, it is the second object of the present invention to improve the cost performance ratio of a magnetic disk apparatus having the data conversion function.

To achieve the first object, in the present invention, a data request analysis unit for accepting a request from a client computer, a data conversion program generation unit, and a data conversion unit are provided in the internal of an active memory unit (for example, magnetic memory unit).

A data conversion program generation unit generates a data conversion program based on the analysis result obtained by the data request analysis unit. The data conversion program generation unit first retrieves a program module required to generate the conversion program among a group of program modules stored in the magnetic disk apparatus to generate the data conversion program corresponding to the request of the client computer. If there is no suitable program module in the magnetic disk apparatus, the program module is retrieved from the client which requested the data or a computer (referred to as program module server hereinafter) which manages a group of program modules, the program module is downloaded by way of a network, the program module is combined to generate the data conversion program.

The data conversion unit downloads the conversion program generated by the data conversion program generation unit, converts the data read out from the magnetic memory medium by use of the program, and transfers the type converted data directly to the client computer by way of the network interface. Furthermore, a buffer management unit is provided between the data conversion unit and the network interface to cope with congestion of the network and the converted data is cashed and re-transmitted as required. If the request from the client computer is a copying of the converted data to another memory, the converted data is transferred to the memory to which the copying is addressed by way of the network interface.

To achieve the second object, the active memory (for example, magnetic disk apparatus) should be rendered usable for general purpose. In detail, a method in which hardware to be used exclusively for respective processes are designed and manufactured results in high cost per one hardware, and the cost performance ratio cannot be high. To improve the usability for general purpose, a method in which the necessary data conversion process is described in a software as a program by the server computer or the client computer and data conversion program is executed on the magnetic disk apparatus is employed. As described herein above for the means to achieve the first object, if there is no suitable data conversion program on the magnetic disk apparatus, the data conversion program is downloaded in the form of a program module by way of the network, and the data conversion program generation unit combines the program module to generate the data conversion program.

The following and other objets, advantages, manner of operation and novel features of the present invention will be understood from the following detailed description when read in connection with the accompanying drawings.

BRIEF DESCRIPTION OF THE DRAWINGS

FIG. 9 is a diagram for describing a physical mapping management table in an embodiment of the present invention.

FIG. 10 is a diagram for describing a data request from a client computer in an embodiment of the present invention.

FIG. 11 is a diagram for illustrating a data conversion program generation unit in the present invention.

FIG. 12 is a diagram for describing an output format conversion module management table in an embodiment of the present invention.

FIG. 13 is a diagram for describing a data format conversion module management table in an embodiment of the present invention.

DETAILED DESCRIPTION OF THE PREFERRED EMBODIMENTS

Figure 1:
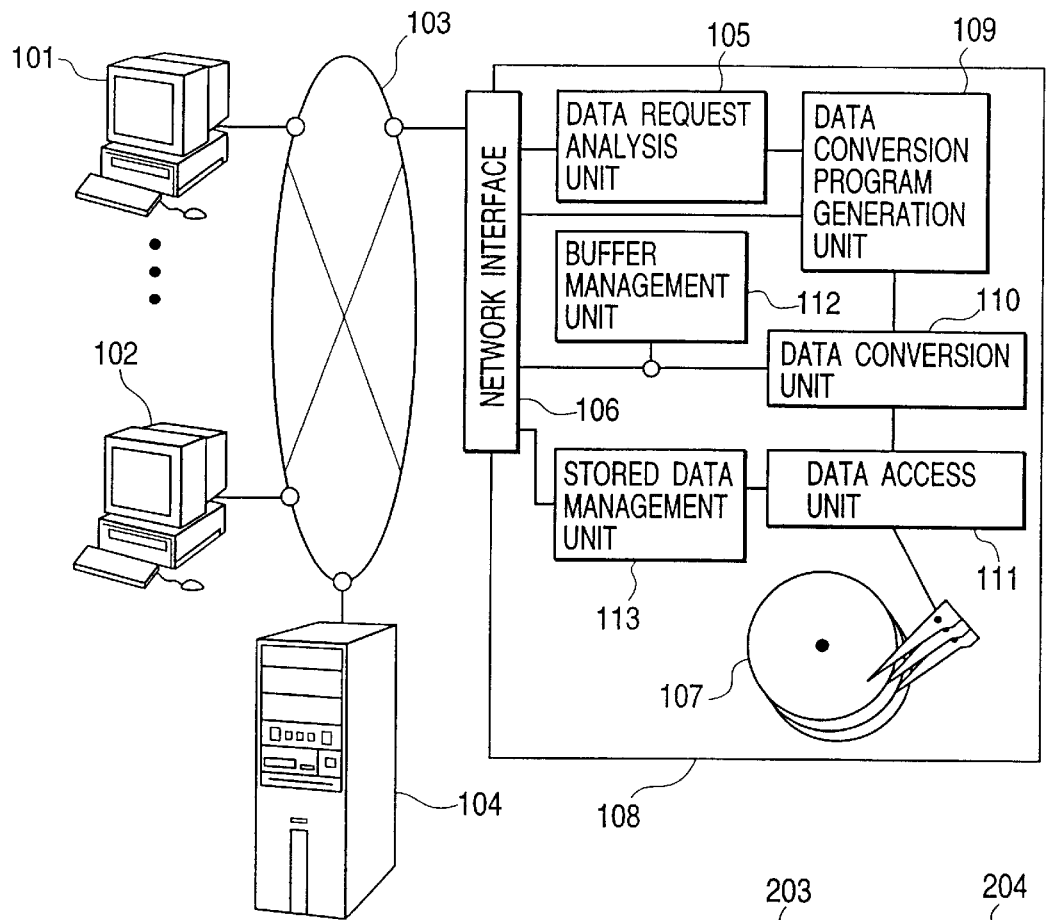
FIG. 1 is a diagram for illustrating the structure of a magnetic disk apparatus directly connected to a network in the present invention.

FIG. 1 shows a block structure of an active memory unit (described hereinafter as a magnetic disk apparatus) connected directly to a network in accordance with the present invention. Client computers 101 and 102, a magnetic disk apparatus 108, and a data conversion program server 104 are connected to a network 103. The client computers 101 and 102 and data conversion program server 104 may be personal computers such as Hitachi FLORA and an arbitrary computer system such as Hitachi 3050 creative work station respectively, and the network may be Ethenet or a local area network connected with optical fibers. The magnetic disk apparatus 108 comprises a network interface for connecting the magnetic disk apparatus to the network and for assuring communication between the client computers and the data conversion program server, a data request analysis unit, a data conversion program generation unit for generating a data conversion program based on an analysis result obtained by the data request analysis unit, a data conversion unit 110 for converting the data stored in a magnetic disk medium 107, a buffer management unit 112 having a built-in cash memory for cashing the converted data as required when the data converted by the data conversion unit is transferred to a client, a stored data management unit 113 for managing the information of the data stored in the magnetic disk apparatus, and a data access unit 111 for taking access to the magnetic memory medium 107 to read out the data. Processes in the magnetic disk apparatus 108 are executed by a CPU, but only the I/O process may be executed by a separate CPU.

Figure 5:
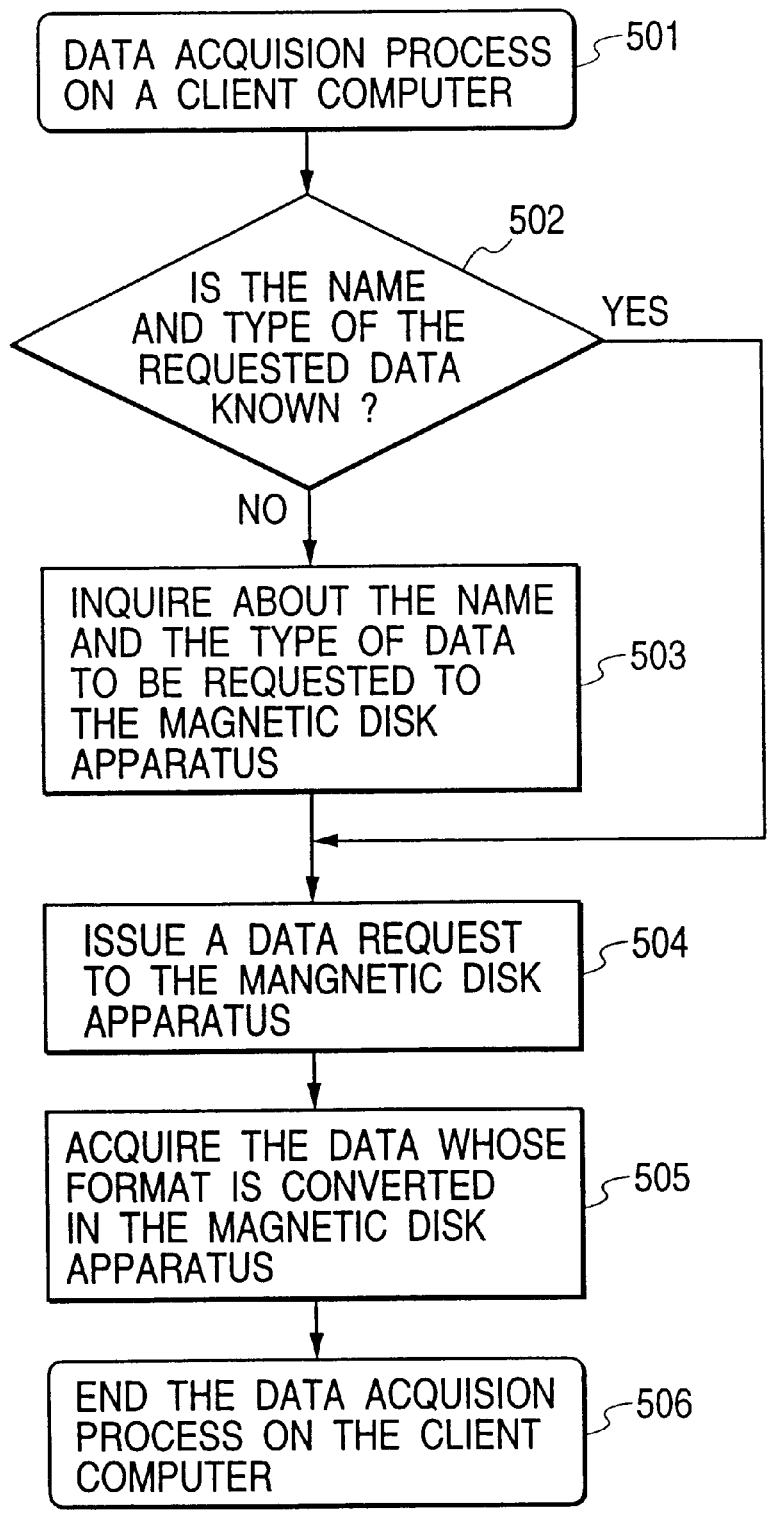
FIG. 5 is a flow chart for describing the data acquisition process procedure of a client computer in the present invention.

The operation of the network directly connected type magnetic disk apparatus 108 is described with reference to FIG. 1, FIG. 5, and FIG. 6. When the client computer 101 acquires the data stored in the magnetic disk apparatus 108 (process 501 in FIG. 5), the client computer 101 inquires about the name and the type of data to be requested to the magnetic disk apparatus 108 (503) if the name or type of the data to be requested is unknown (if No is selected in the judgement process 502). The stored data management unit 113 of the magnetic disk apparatus manages a data property management table 801 shown in FIG. 8 and a physical mapping management table 901 shown in FIG. 9. The data property management table provides the information required to access to the data stored in the magnetic disk. In the associated database, the name of the data requested by the client is equivalent to the table name and column name, and the data type is equivalent to the column type 805. Furthermore, the semantic information 806 associated with column is held. The semantic information is used for more excellent mapping and for supporting the data integration when the data stored in the magnetic disk apparatus is used with other data in the integrated form. However, the semantic information is not essential in the embodiment of the present invention.

The physical mapping management table manages the information of the table name 902, record ID (903), block 904, and offset 905, converts the logical data request to a physical data request, and provides the information which is necessary when the data access unit 703 takes an access to the magnetic memory medium 704 where the data is stored. For example, in the case that an inquiry 906 is given to the Employee table and the ID of the record which satisfies the condition is 100, it is found that the record is located at the 12800 offset position of the 537-th block of the magnetic memory medium by referring to the physical mapping management table, and the data stored in the magnetic memory medium 704 is read out.

After completion of inquiry process (503) for the name or type of the data to the magnetic disk apparatus, or in the case that the client computer knows the name and type of the data to be required (Yes is selected in the judgement process 502), the client issues the data request to the magnetic disk apparatus. An example of the data request is shown in FIG. 10. The data request includes three designations of data output format 1001, data acquisition condition 1002, and data type conversion 1003. For example, the first entry 1004 indicates that the data format to be generated is a record, the acquisition condition of the data is all columns of employees of H Inc. whose birth data are Jan. 1, 1960 or after (cf. FIG. 8), and the data type is not to be converted, the second entry 1005 indicates that the data format to be generated is a column value, the acquisition condition of the data is the employee ID of employees of H Inc. whose name is "Itaru", and the output data type is to be converted to Char (15), the third entry 1006 indicates that the data format to be generated is the XML document without designation of document definition, the acquisition condition of the data is all column information of employees of H Inc. whose birth data is Jan. 1, 1960 or after, and the output data type is to be not converted, and the fourth entry 1007 indicates that the data format to be generated is the XML document of document definition given by DTD (Document Type Definition) in the site http://hitachi.co.jp/emp.dtd on the Internet, the acquisition condition of the data is the ID and the name of employees of H Inc. whose birth data is Jan. 1, 1960 or after, the connected family name Fam_Name and given name Fir_Name with a space is to be converted to Name.

After the client computer issues the data type request, the client computer acquires the data having the type converted by the magnetic disk apparatus (505), and the data acquisition process is brought to an end (506).

Next, the data conversion process (601) in the magnetic disk apparatus is described. The magnetic disk apparatus receives the data type request from the client computer (602), and checks whether there is a program for data conversion on the magnetic disk or not. To check it, the program module management unit 1101 in FIG. 11 in the data conversion program generation unit 109 manages the output format conversion module management table 1102 shown exemplarily in FIG. 12 and the data type conversion module management table 1103 shown exemplarily in FIG. 13, and if the output format is specified, then refers (1107) to the output format conversion module management table and the data type conversion module management table to check (1108) whether the program module storage (1104) in the data conversion program generation unit stores the required data type conversion module already or not. Herein the program module storage may realize it by use of the memory in the magnetic disk apparatus or may realize it by use of a part of the magnetic memory medium.

If the program module storage already stores the data type conversion module to be required (if the Yes is selected in the judgement process 603), then the program composition unit 1105 in the data conversion program generation unit generates a data conversion program by use of the module and converts the data (607). Herein the relation between the data conversion program and the format conversion module and data type conversion module (these two conversion modules are referred to as program module hereinafter) is described with reference to FIG. 12 and FIG. 13. The data output format is specified in response to a data request from the client computer, a plurality of processes are required generally to convert the data format to the specified output format. For example, to perform the column value projection process shown in the entry 1205, it is required to perform the record selection process and column projection process. The program unit for performing these processes is referred to as program module. A suitable combination of modules may be selected correspondingly to the data format to be generated. For example, though both entries 1205 and 1206 involve extraction of column values, the entry 1205 uses Proj_Column_NoVar () as the program module for column projection for the reason that the column is not VARChar (variable length character string), and on the other hand, the entry 1206 uses Proj_Column() for the reason that the column is VARChar. In general, Proj_Column_NoVar() is more efficient than Proj_Column(), therefore the method for generation of the conversion program with switching the program module suitably is very important. FIG. 13 is a data type conversion module management table for managing the data type conversion module. The data type conversion module is used in the same manner as the utility function for converting the data type.

Figure 6:
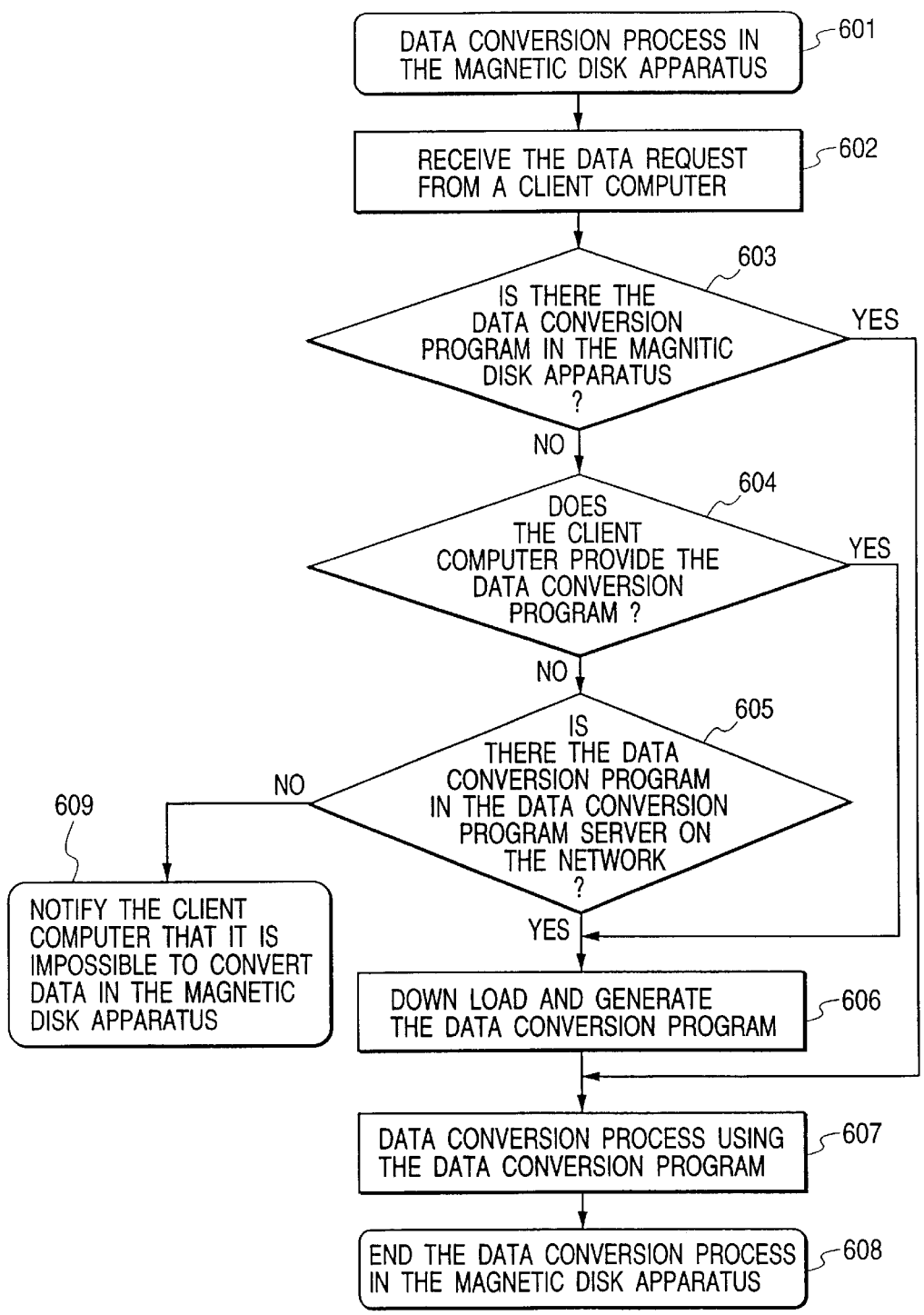
FIG. 6 is a flow chart for describing the data conversion process procedure in a magnetic disk apparatus in the present invention.
Figures 7, 8:
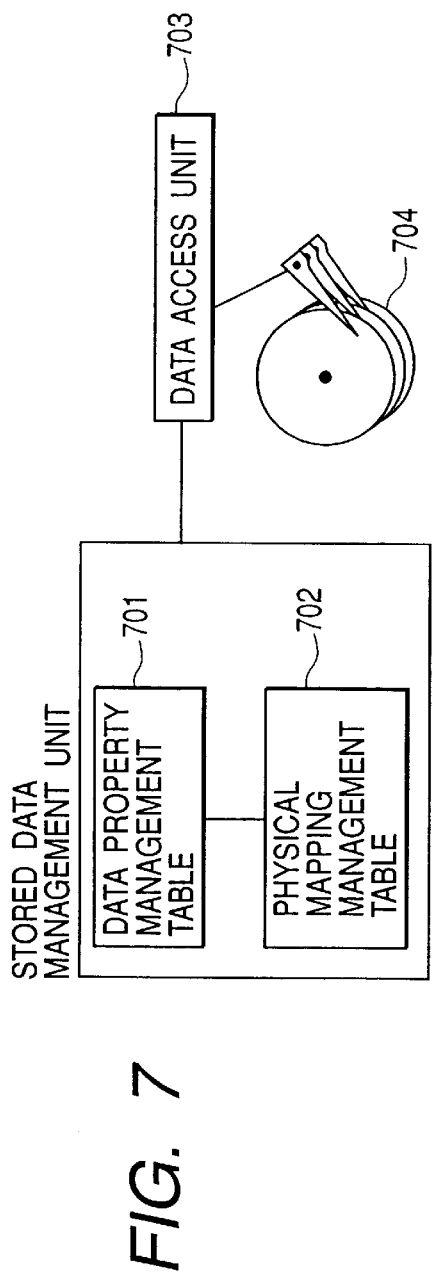
FIG. 7 is a diagram for illustrating the structure of a stored data management unit in the present invention.
FIG. 8 is a diagram for describing a data property management table in an embodiment of the present invention.

Again FIG. 6 is addressed, if the data conversion program generation unit does not store the data type conversion module partially or entirely (if No is selected in the judgement process 603), then the program module management unit inquires by way of the network interface 1106 whether the client who had issued the data type conversion request provides the data conversion program module or not, if the client provides the data conversion program module (if Yes is selected in the judgment process 604), then the provided program module is downloaded, and the program composition unit generates a conversion program. On the other hand, if the client does not provide the data conversion program (if No is selected in the judgement process 604), then the program module management unit inquires whether there is the program module in the data conversion program server 104 on the network or not, and if there is the program module (if Yes is selected in the judgement process 605), then the program module is downloaded from the data conversion program server, the program composition unit generates a data conversion program (606), and the data conversion process is performed by use of the generated program (607). If there is no program module on the data conversion program server (if No is selected in the judgement process 605), then the notice that the data conversion process cannot be performed is notified to the client computer without generation of a data conversion program (609).

A program module which is protected in security and not dependent on the platform is generated by using the programming language as described in Section 3 of "The Java Tutorial" by Mary Campione, Kathy Walrath, ISBN 0-201-

63454-6 (referred to as literature 3) as a preferable example as for describing the program module. However, a method in which an architecture dependent program module of the magnetic disk apparatus is used to download a module which is necessary for the magnetic disk apparatus may be used.

Next, the record selection process and column projection process in the magnetic disk apparatus are described.

Figure 3:
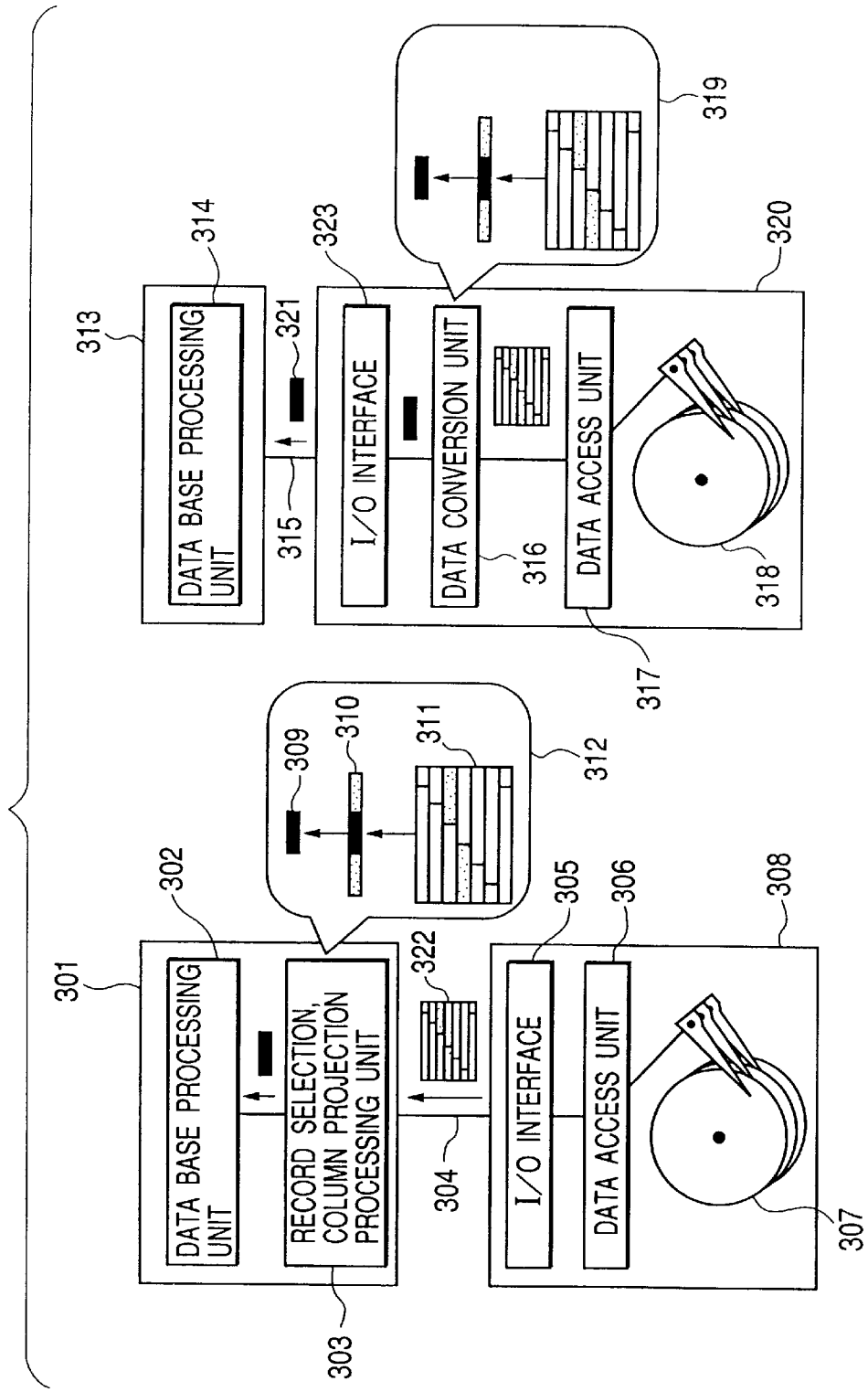
FIG. 3 is a diagram for describing the comparison of processing system between a magnetic disk apparatus in the present invention and a magnetic disk apparatus in the conventional method.

A conventional system in which the record selection process and column projection process are applied to a database management system (referred to as DBMS hereinafter) and an example in which the record selection process and column projection process are applied to the magnetic disk apparatus of the present invention are shown in FIG. 3 in parallel. Because the access unit is limited to the lock unit access in the data access unit 306 of the magnetic disk apparatus shown as 301~312 in FIG. 3 (conventional system), a block 322 including the required data is transferred to the DBMS (301) by way of the I/O interface (304).

The record selection process and the column projection process are performed (312) in the record selection and column projection processing unit 303 of the DBMS, and the projected column is transferred to the database processing unit 302. On the other hand, in the present invention shown as 313~323 in FIG. 3, because the record selection process and the column projection process 319 are performed in the data conversion unit 316 in the magnetic disk apparatus 320, only the projected column 321 is transferred to the DBMS (313) by way of the I/O interface 323, the transferring load on the network 315 is reduced. It is assumed in this embodiment that an internal network for connecting between the DBMS and the magnetic disk apparatus is used, however as described hereinbefore, in the case that the magnetic disk apparatus is a magnetic disk apparatus directly connected to a network, 304 and 315 may be LAN or Internet, and in such case the network load is reduced more effectively. In addition to this case, the embodiment of the present invention allows the elimination of the record selection process and column projection process. Because the record selection process and the column projection process are basic process in the associated database system and these processes are required to be performed in the majority of inquiry process, the present invention brings about the significant DBMS lead reduction effect.

In this embodiment the record selection process and the column projection process are performed on the magnetic disk apparatus, however, the processing unit can be switched flexibly so that only the record selection process is performed on the magnetic disk apparatus when the DBMS load is light, or to the contrary the tabulation process is performed on the magnetic disk apparatus in addition to the record selection process and the column projection process when the DBMS load is heavy, by means of download of the program module to the magnetic disk apparatus and by means of generation and execution method of the data conversion program, such switching can bring about the significant effect.

Figure 4:
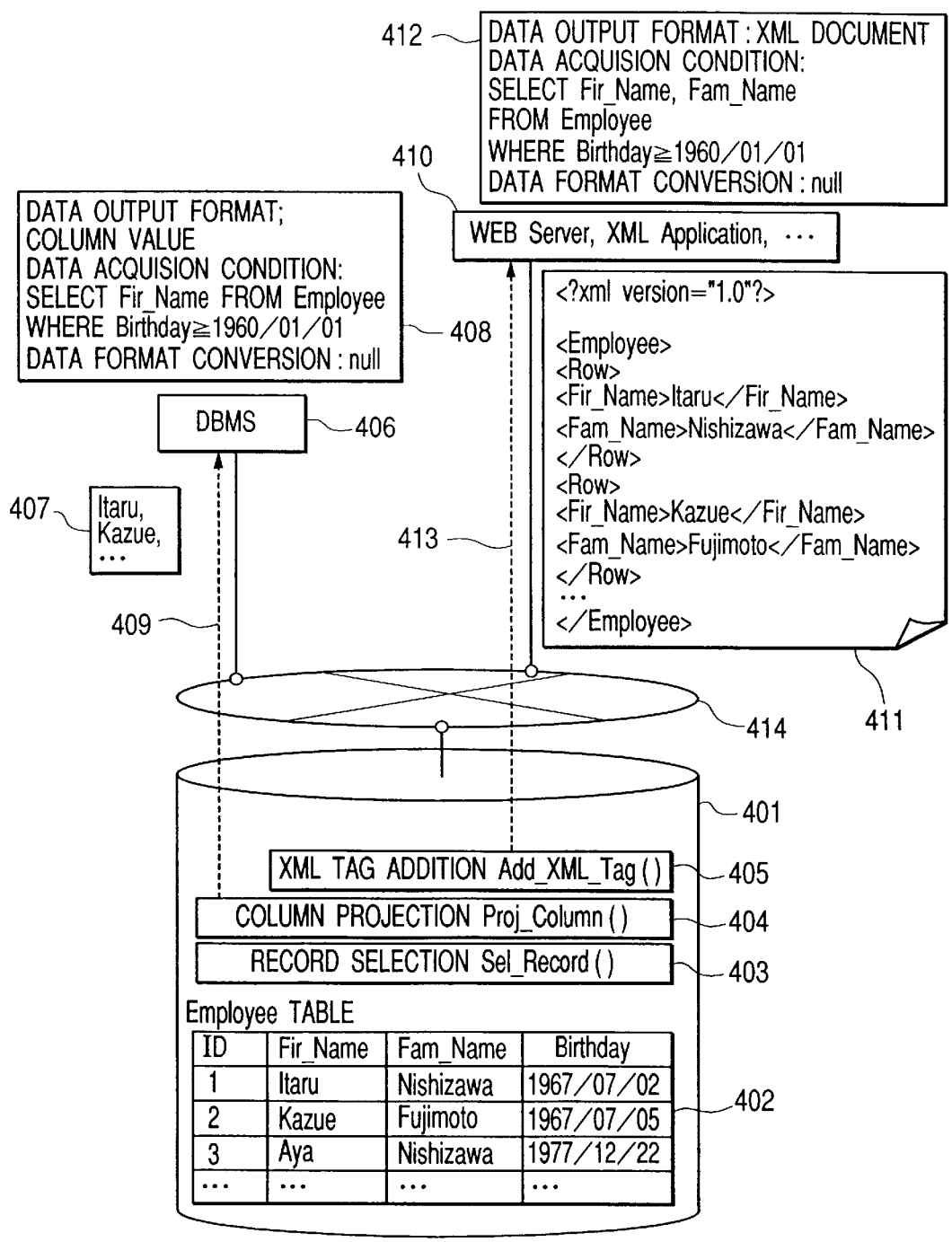
FIG. 4 is a diagram for describing XML data generation method in the case that there is no designation of document definition in the embodiment of the present invention.

Next, an example for generating the XML document in the case that there is no designation of document definition is described with reference to FIG. 4. In FIG. 4, the XML application 410 including the DBMS (406) and WEB Server is connected to the magnetic disk apparatus 401 by way of the network 414. First, the case in which the DBMS issues a data request as shown in 408 is assumed. Because the data output format is the column value, the format conversion module for the record selection process 403 and for the column projection process 404 is applied, and the value (407) which satisfies the data acquisition request condition is returned to the DBMS (409) by way of the network. On the other hand, in the case that the XML application requests the XML data without designation of document definition, the record selection process and the column projection process are applied as described for FIG. 12, and then the XML document (411) where the column value which satisfies the data acquisition condition tagged with the table name for each row is generated, and it is returned to the XML application (413). In the present embodiment, because all the entries of the first to third entries in the Employee table satisfy the data acquisition condition, the XML document tagged with the table name <Employee>, and column names of the Employee table <Fir_Name> and <Fam_Name> for each row <Row> is generated.

Figure 14:
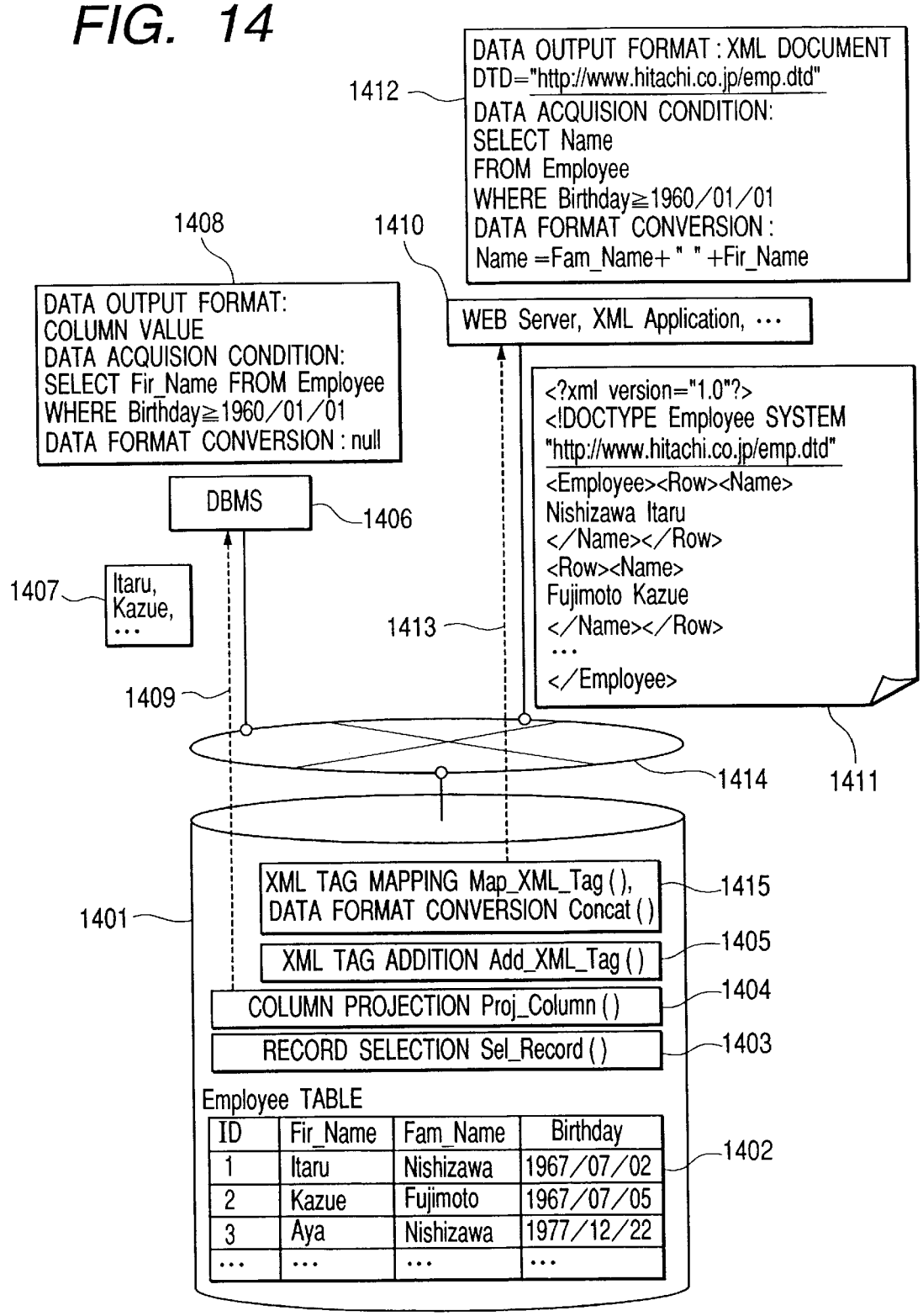
FIG. 14 is a diagram for describing an XML data generation method in the case that there is a designation of document definition in an embodiment of the present invention.

An example of the XML document generation is described using FIG. 14 for the case in which there is the designation of document definition is described. The structure of the DBMS side is the same as that shown in FIG. 4, and the description is omitted. When the XML application issues the data request 1412 including the XML document definition designation and data type conversion designation, the XML tag mapping and data type conversion 1415 in addition to the record selection process 1403, the column projection process 1404 and the XML tagging 1405 are applied as the program module in the same manner as in the case that there is no designation of document definition, and the XML document 1411 after conversion is returned to the XML application. In the present example, because the same condition as shown in FIG. 4 is applied, the same entries are generated, however the XML document converted so as to accord with the designated document definition is generated. Because the new character string formed by concatenating the column Fam_Name (family name) and Fir_Name (given name) with a space in-between is defined as Name (name), for example, the first entry includes the table name <Employee>, row <Row>, and subsequent <Name>, and the character string "Nishizawa Itaru" placed between tags appears in the XML document 1411.

Figure 2:
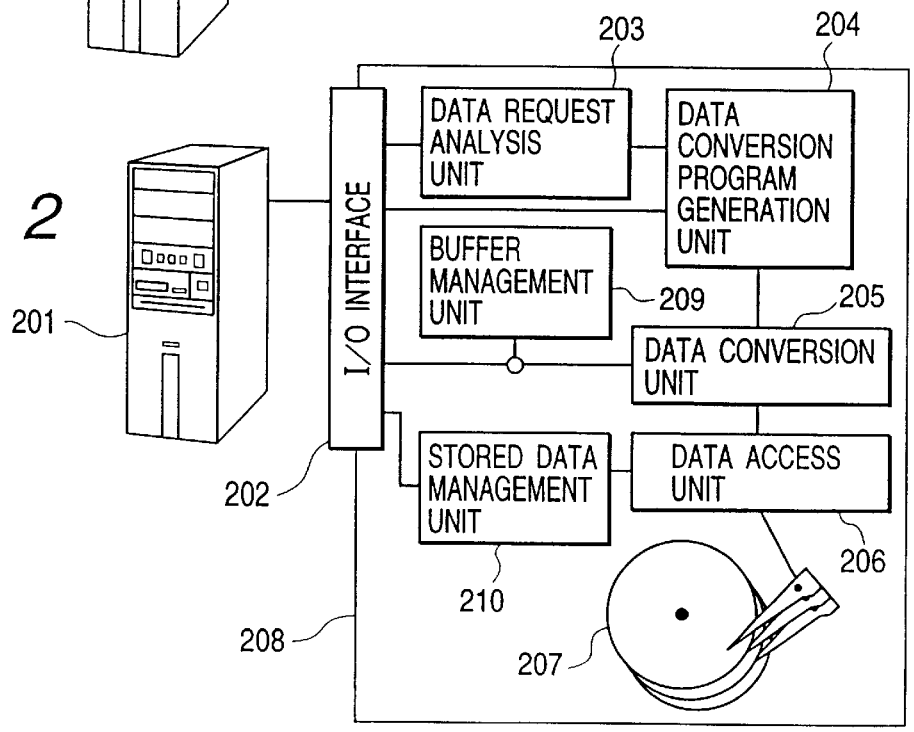
FIG. 2 is a diagram for illustrating the structure of a magnetic disk apparatus connected to a computer in the present invention.

Finally, the computer directly connected type magnetic disk apparatus of the present invention shown in FIG. 2 is described. The structure shown in FIG. 2 is the same as that of the network connected type magnetic disk apparatus of the present invention essentially. In detail, the network interface 106 in the structure shown in FIG. 1 corresponds to the I/O interface 202 of the computer 201 in the structure shown in FIG. 2. The structure shown in FIG. 2 is different only in that the computer 201 is used for download of a data conversion program instead of the client computer 101 and data conversion program server 104 on the network, the operation is the same as that of the computer directly connected type magnetic disk apparatus, and the description is omitted. The effect of this example is the same as that of the computer directly connected type magnetic disk apparatus, in detail, the transfer load between the computer and magnetic disk apparatus is reduced, and the process load of the computer is reduced.

In this example, the data acquisition condition is described by use of SQL (Structured Query Language) language, however otherwise other languages may be used.

In this example, the document definition is described by use of DTD, however otherwise it is obvious that other description such as DCD (Document Content Descriptions) may be used, furthermore in this example, an example in which the data stored in the magnetic memory medium is of record type of associated database, however otherwise it is obvious that the conversion program may be used for the process of tag mapping and the following processes in the case that the data is the language with tag such as HTML.

Figure 15:
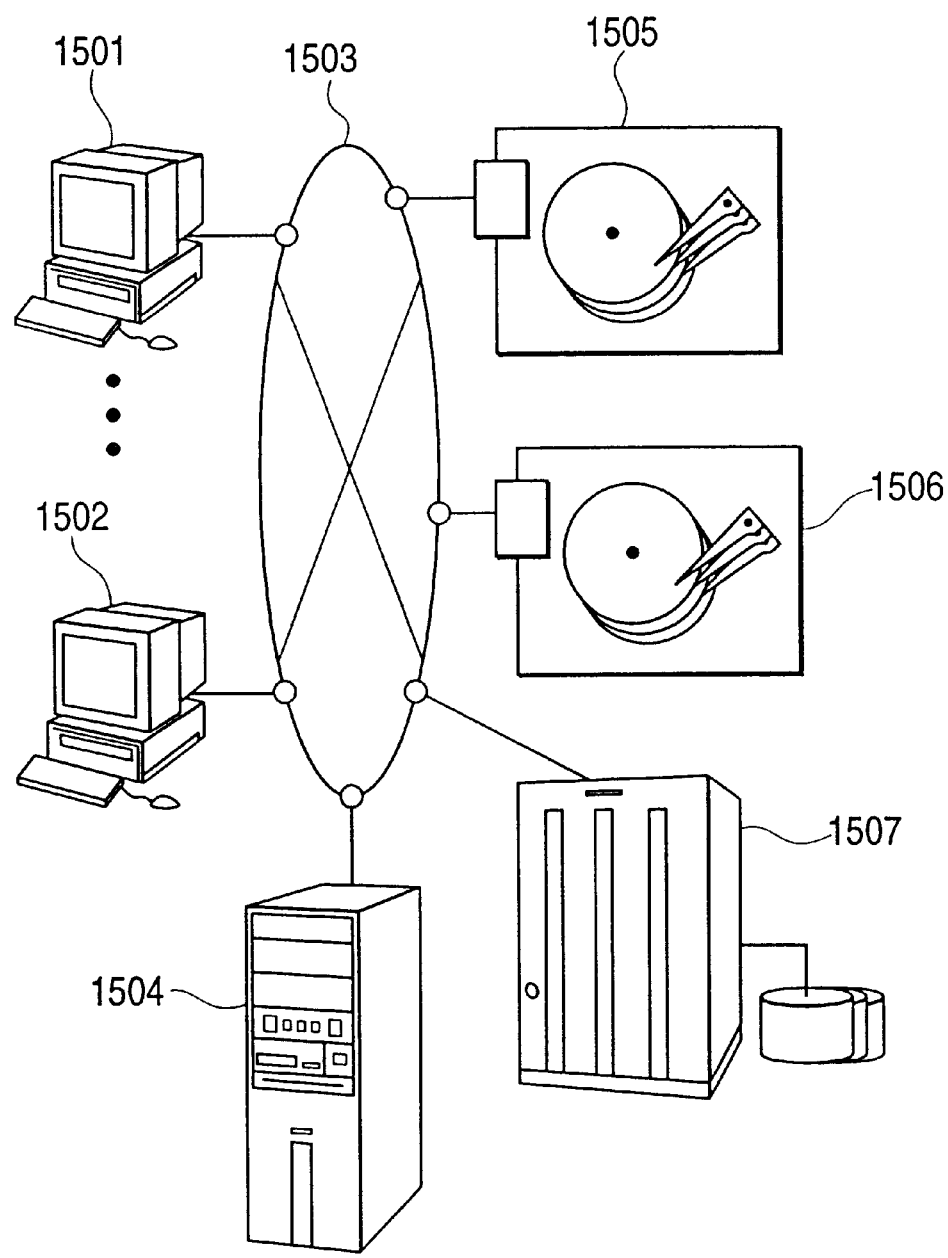
FIG. 15 is a diagram for describing an application example of the data conversion in an active memory unit directly connected to a network and the data storage to a storage server in an embodiment of the present invention.

FIG. 15 shows an embodiment in which a plurality of client computers 1501 to 1502, magnetic disk apparatus 1505 and 1506, a storage server 1507, and a data conversion program server 1504 are connected to a network 1503. In this structure, the client computer 1501 can issue to the magnetic disk apparatus 1505 a request that the data is converted to a desired type and stored in the other magnetic disk apparatus 1506 or the storage server 1507, in this case the data is not transferred from the magnetic disk apparatus 1505 to the client computer 1501. In other words, the present invention is not necessarily limited to the case that the data is directly transferred from the magnetic disk apparatus to the client computer in response to the request from the client computer.

Figure 16:
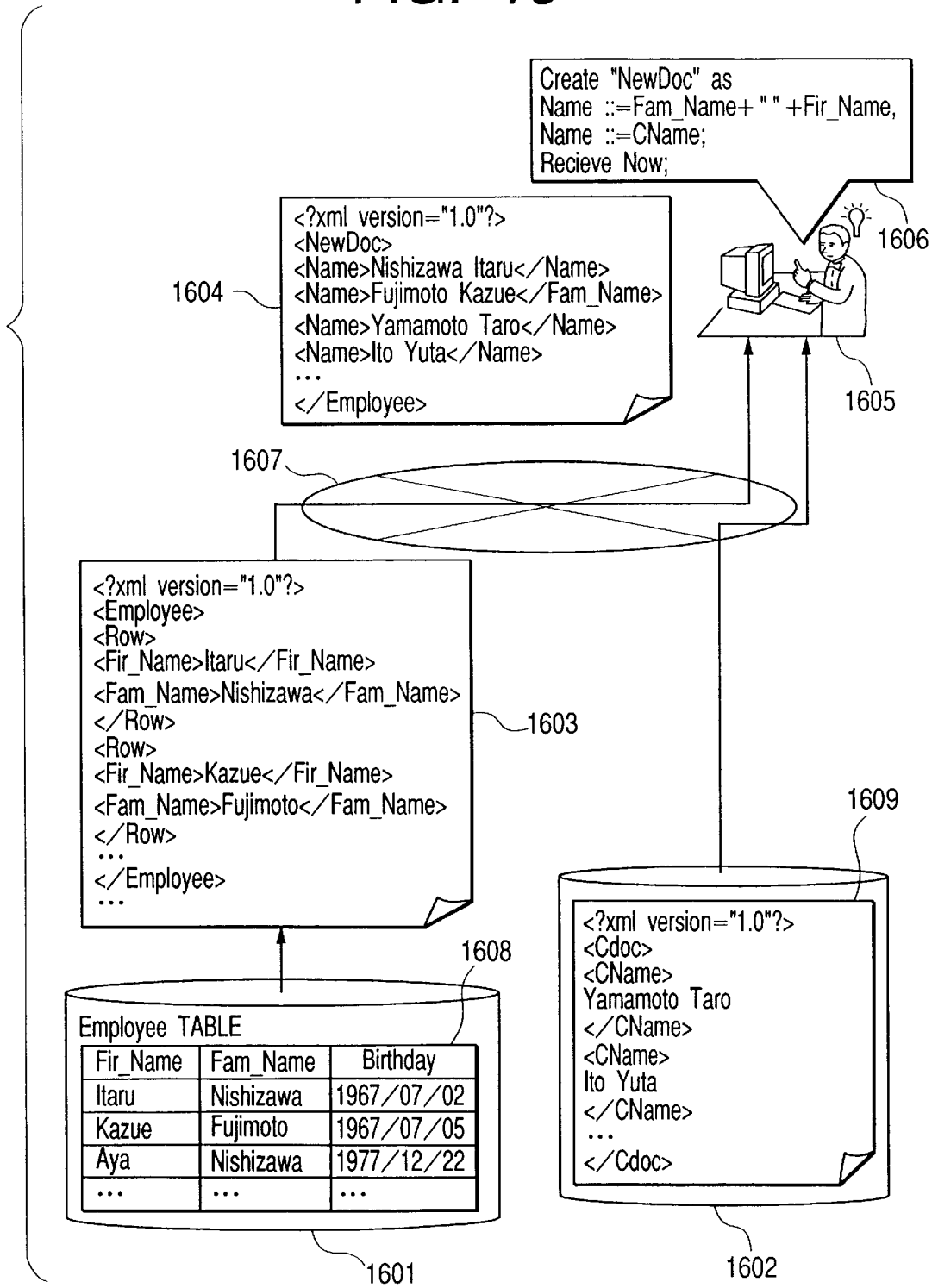
FIG. 16 is a diagram for illustrating the system structure of a different data format integration system in an embodiment of the present invention.

A heterogeneous data integration system which uses an active memory of the present invention is described with reference to FIG. 16 and FIG. 17. In FIG. 16, the active memory 1601 and 1602 store the table type data 1608 and XML document 1609 respectively. It is assumed that a user integrally uses two data having different expression and structure from the client computer 1605. When the user wants to use the two data as the data having a name of NewDoc having a new structure, for example, the user can acquire a new data 1604 including the combination of Fir_Name and Fam_Name in 1608 and the data of 1609 by designating, for example, as 1606. Because the user designates so as to acquire an answer immediately in 1606, the new data is transmitted to the user immediately.

Figure 17:
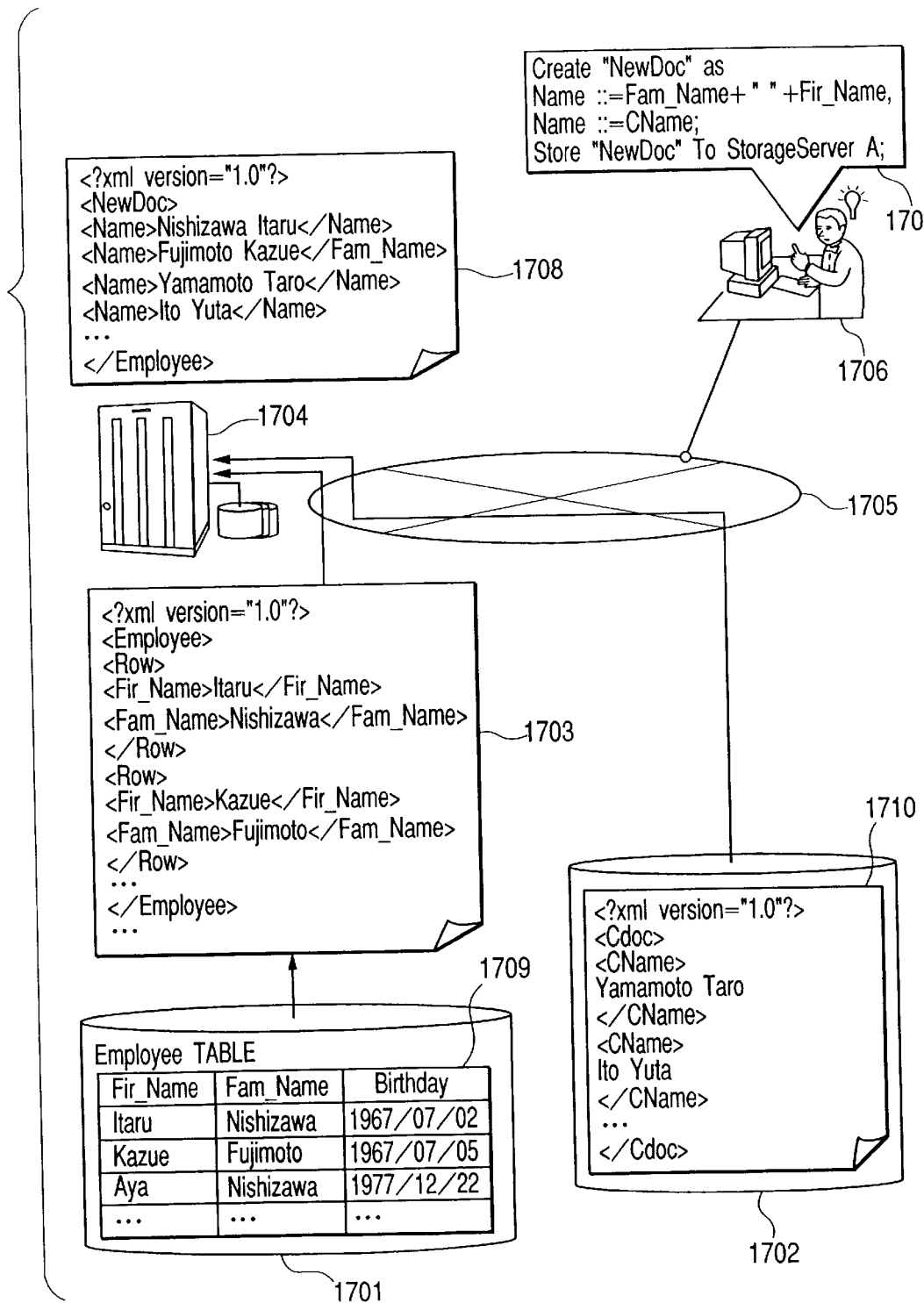
FIG. 17 is a diagram for illustrating the system structure of another different data format integration system in an embodiment of the present invention.

On the other hand, in the example shown in FIG. 17, the user designates so that the new data is generated and stored in the storage server A (1704). Such designation is effective in the cases (1) it takes a long time for conversion because of a large amount of data to be converted, (2) the converted data is to be stored for repeated reference and is used not temporarily, and (3) a manager wants to arrange the data for often using by other users.

According to the present invention, effects described herein under are obtained.

(1) A general purpose active memory (for example, magnetic disk apparatus) which is capable of flexibly accommodating the request of the client computer is provided.

(2) The data is converted in the active memory to solve the bottleneck of the server computer process and improve the scalability of the whole system.

(3) The data conversion process in the client computer of the data use side can be omitted, and the process efficiency of the client computer is improved.

What is claimed is:

1. A memory control method used for an active memory provided with a memory medium for storing data, a data processing unit, and an external connection interface unit, and connected to client computers comprising the processes of:

(1) accepting a data request from a client computer by way of said external connection interface;

(2) analyzing a type of said requested data and reading out the requested data from said memory medium by use of said data processing unit;

(3) generating a data type conversion program based on said analysis result by use of said data processing unit;

(4) converting the type of said data read out in the process (2) by means of said data type conversion program to the type obtained by said analysis by use of said data processing unit, the process comprising at least one of a selection of database record and a column projection, in the case that the application on the client computer is an associated database; and (5) directly transferring the converted data to said client computer or storing the converted data in the form previously requested from said client computer of the requester.

2. A memory control method used for an active memory provided with a memory medium for storing data, a data processing unit, and an external connection interface unit, and connected to client computers comprising the processes of:

(1) accepting a data request from a client computer by way of said external connection interface;

(2) analyzing the type of said requested data and reading out the requested data from said memory medium by use of said data processing unit;

(3) generating a data type conversion program based on said analysis result by use of said data processing unit;

(4) converting the type of said data read out in the process (2) by means of said data type conversion program to the type obtained by said analysis by use of said data processing unit, the process being a process for giving additional tag information including an XML tag to describe the content of said data to said data and to convert said data to a language including XML; and (5) storing the converted data in the form previously requested from said client computer of the requester.

3. A memory control method used for an active memory provided with a memory medium for storing data, a data processing unit, and an external connection interface unit, and connected to client computers comprising the processes of:

(1) accepting a data request from a client computer by way of said external connection interface;

(2) analyzing the type of said requested data and reading out the requested data from said memory medium by use of said data processing unit;

(3) generating a data type conversion program based on said analysis result by use of said data processing unit;

(4) converting the type of said data read out in the process (2) by means of said data type conversion program to the type obtained by said analysis by use of said data processing unit, the process comprising at least any one process of a selection of database record and a column projection, and a process for giving XML tag information to the record or column after said processing in the case that the data stored in said memory medium is the record data of the associated database; and (5) storing the converted data in the form previously requested from said client computer of the requester.

4. A memory control method used for an active memory provided with a memory medium for storing data, a data processing unit, and an external connection interface unit, and connected to client computers, comprising the processes of:

(1) accepting a data request including a designation of data format and data type, from a client computer by way of said external connection interface unit;

(2) analyzing the received data request to determine conversion program modules which are necessary for converting data read out from said medium into output data according to said designation of data format and data type;

(3) composing a data conversion program by combining the determined conversion program modules;

(4) reading out the requested data from said medium and converting the format and type of the read out data by use of said data conversion program; and (5) returning the converted data from said external connection interface unit to the client computer of the requester by way of a network or directly.

5. A memory control method according to claim 4, wherein the process (3) includes a step of judging whether each of said conversion program modules which are necessary for converting data is stored in the active memory or not, and a step of obtaining at least one conversion program module which is judged to not be stored in the active memory through the external connection interface unit.

6. A memory control method according to claim 5, wherein the conversion program module is transferred from said client computer of a requester.

7. A memory control method according to claim 5, wherein the conversion program module is transferred from a conversion program server connected to said external connection interface unit.

8. A memory control method according to claim 5, wherein when the data request is requested from an XML application, a conversion program module for adding the additional tag information expressed by XML tags to data read out from said medium is determined in the process (2).

9. A heterogeneous data integration system including a plurality of active memories, each being provided with a memory medium for storing data and each being connected to client computers via a network, wherein, at least one of said active memories includes means for converting data of table type, read out from said memory medium, into XML document by adding tag information expressed by XML tags to the data read out from said medium, and means for outputting the converted data, and wherein the heterogeneous data integration system further includes means for integrating at least one of the expression and logical structure of data output from a plurality of active memories by XML tag mapping.

* * * * *